United States Patent
Cloutier et al.

(10) Patent No.: US 6,920,527 B2
(45) Date of Patent: Jul. 19, 2005

(54) PORTABLE RAM DRIVE

(75) Inventors: Jon W. Cloutier, Austin, TX (US); Richard C. Counts, Cedar Park, TX (US); Henry Wurzburg, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 333 days.

(21) Appl. No.: 10/364,583

(22) Filed: Feb. 11, 2003

(65) Prior Publication Data

US 2004/0158674 A1 Aug. 12, 2004

(51) Int. Cl.$^7$ .............................................. G06F 12/00
(52) U.S. Cl. ...................................... 711/115; 711/101
(58) Field of Search ................................ 711/115, 101

(56) References Cited

U.S. PATENT DOCUMENTS

| | | | |
|---|---|---|---|
| 6,119,944 A | 9/2000 | Mulla et al. | 235/472.03 |
| 6,522,534 B1 | 2/2003 | Wu | 361/686 |
| 6,614,708 B1 * | 9/2003 | Lin et al. | 365/228 |
| 2003/0217206 A1 * | 11/2003 | Poo | 710/68 |
| 2005/0020304 A1 * | 1/2005 | Shinzaki | 455/556.1 |

OTHER PUBLICATIONS http://www.pendrive.com/intro.php, 2001, 3 pages.
http://www.pendrive.com/features.php, 2001, 3 pages.

* cited by examiner

*Primary Examiner*—Reba I. Elmore
(74) *Attorney, Agent, or Firm*—Meyertons Hood Kivlin Kowert & Goetzel, P.C.; Jeffrey C. Hood; Russell E. Henrichs

(57) ABSTRACT

A portable RAM drive comprising data stored on a non-volatile memory and transferable to a volatile memory when the portable RAM drive is coupled to a computer system. When the portable RAM drive is plugged into the computer system, the data from the non-volatile memory may be transferred to the volatile memory for faster access by the computer. If the portable RAM drive is unplugged from the computer, an internal power source may power the portable RAM drive long enough to transfer the data from the volatile memory to the non-volatile memory. In one embodiment, the portable RAM drive may use a restraining device or an indicator light to indicate to the user that the portable RAM drive should not be unplugged from the computer because the data has not yet been transferred from the volatile memory to the non-volatile memory.

20 Claims, 5 Drawing Sheets

PORTABLE RAM DRIVE

BACKGROUND OF THE INVENTION

1. Field of the Invention

The present invention relates generally to computer storage mediums and specifically to portable computer storage mediums.

2. Description of the Related Art

Portable storage mediums for computer systems may allow a user to carry data from one computer system to another computer system. Among other uses, portable storage mediums may allow a user to back up critical data from a computer hard drive. Portable storage mediums, such as floppy disks and compact discs (CDs), may allow data to be read and written to a moveable disk surface. However, many portable storage mediums have drawbacks. For example, floppy disks may be slow and hold under five megabytes of data. Compact discs may hold more data than a floppy disk, but they may be difficult to write to and generally may only be desirable for holding data that will not be modified (e.g., executable programs and archives).

Portable storage mediums may also be relatively large and easily damaged. For example dropping a floppy disk or scratching a CD surface may result in a loss of stored data. Other portable storage mediums, such as memory sticks, may use non-volatile memory, have moveable parts, and/or be easily damaged if dropped. Portable storage mediums may also be relatively slow to read and write to compared to a computer hard drive and random access memory (RAM). A portable storage medium may use non-volatile memory that generally requires power to maintain the memory. However, non-volatile memory may be significantly slower than volatile memory. Therefore, an improved portable memory device is desired.

SUMMARY OF THE INVENTION

One embodiment of the invention comprises a portable memory apparatus such as, but not limited to, a portable RAM drive. The portable RAM drive may comprise a housing, a memory controller, a volatile memory, a non-volatile memory, and a connector to connect the portable RAM drive to the computer system. Data may be stored on a non-volatile memory when the portable RAM drive is not coupled to a computer system and stored on a volatile memory when the portable RAM drive is coupled to the computer system. The computer system may access data on the volatile memory at a higher speed than the data on the non-volatile memory. When the portable RAM drive is plugged into the computer system, the data from the non-volatile memory may be transferred to the volatile memory for faster access by the computer system. If the portable RAM drive is unplugged from the computer system, an internal power source may power the portable RAM drive long enough to transfer the data from the volatile memory to the non-volatile memory.

In one embodiment, the portable RAM drive may not have the internal power source, but may instead rely on an indicator, such as, but not limited to, an indicator light, to indicate to a user that the portable RAM drive should not be unplugged from the computer system because the data has not yet been transferred from the volatile memory to the non-volatile memory. In one embodiment, if the portable RAM drive does not have the internal power source, a restraining device may be used to restrain the portable RAM drive to the computer system until the data can be transferred from the volatile memory to the non-volatile memory.

BRIEF DESCRIPTION OF THE DRAWINGS

A better understanding of the present invention may be obtained when the following detailed description is considered in conjunction with the following drawings, in which.

Figure 1:
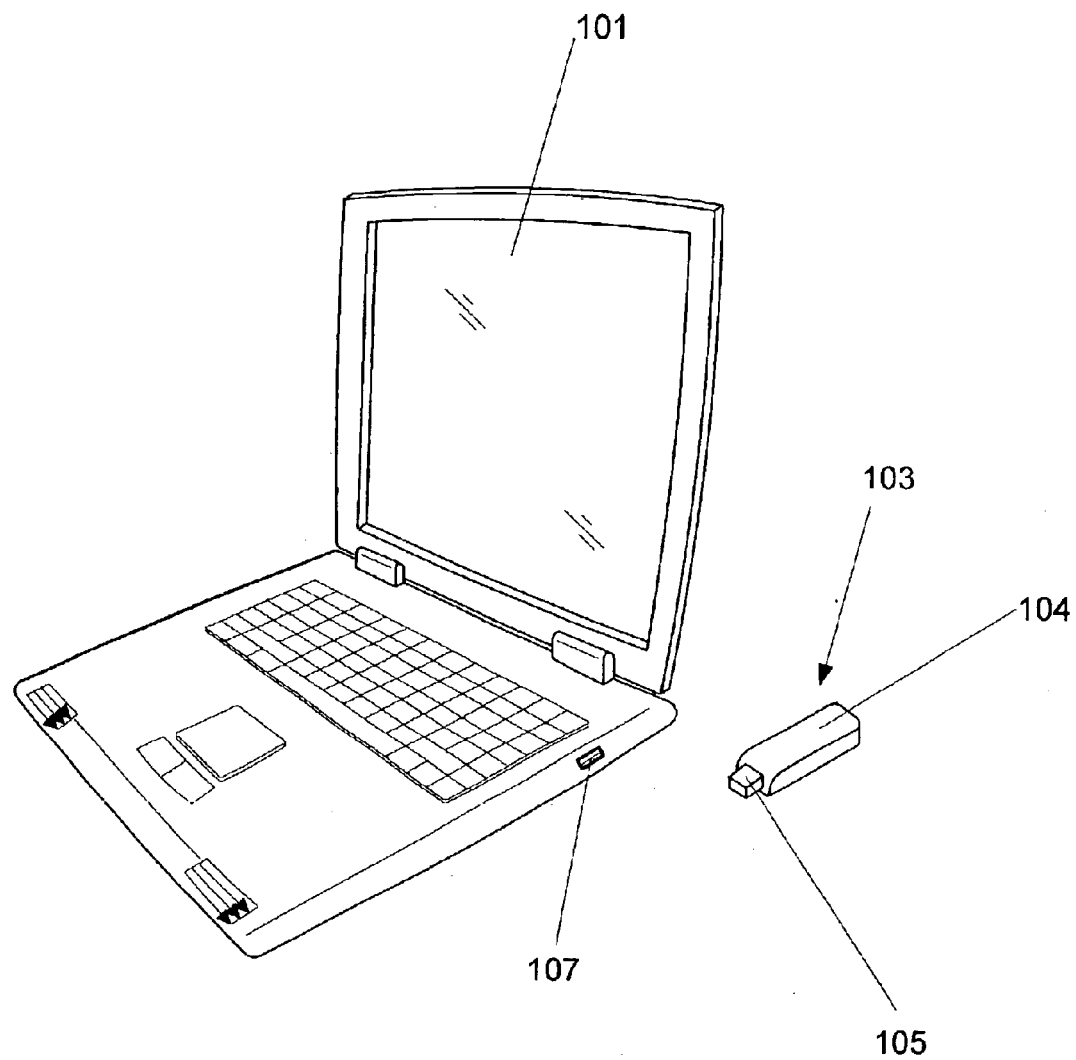
FIG. 1 illustrates a computer system and a portable RAM drive, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1: Computer System with a Portable RAM Drive

FIG. 1 illustrates one embodiment of a computer system and a portable memory apparatus 103 such as, but not limited to, a portable RAM drive. The portable RAM drive 103 may include a housing 104 and a connector 105. In one embodiment, the portable RAM drive 103 may store data on a non-volatile memory and copy the data to a volatile memory when the portable RAM drive is coupled to a computer system, such as, but not limited to, a laptop 101. Other computer systems, such as, but not limited to, a personal computer, may also be within the scope of the invention. In one embodiment, the portable RAM drive may be coupled to the laptop 101 through a connector 105 on the portable RAM drive 103 and a USB connector 107 on the laptop 101. Other connectors such as, but not limited to, a firewire connector and an advanced technology attachment (ATA) serial connector may also be within the scope of the invention. In one embodiment, the portable RAM drive 103 may have a housing 104 made of an outer impact resistant shell. The housing 104 may be made of a material such as, but not limited to, acrylonitrile butadiene styrene (ABS) plastic or polycarbonate. Also, in one embodiment, the portable RAM drive 103 may not have any moving parts.

Figure 4:
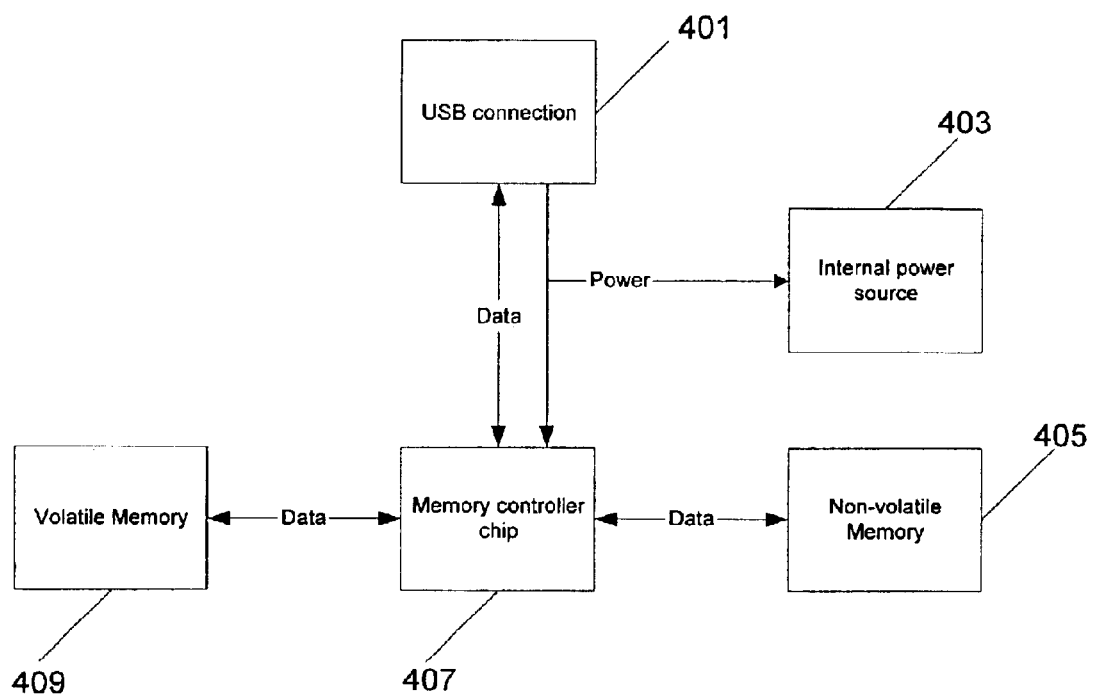
FIG. 4 is a block diagram of a portable RAM drive, according to one embodiment.

FIG. 4: A Portable RAM Drive Block Diagram

FIG. 4 is a block diagram of one embodiment of a portable RAM drive 103. In one embodiment, the housing 104 of the portable RAM drive 103 may comprise a USB connection 401, an internal power source 403, a memory controller chip 407, a volatile memory 409, and a non-volatile memory 405. The memory controller chip 407 may couple the volatile memory 409 to the non-volatile memory 405. In one embodiment, the volatile memory 409 may include, but is not limited to, a fast page mode dynamic random access memory (FPM DRAM), extended data out dynamic random access memory (EDO DRAM), synchronous dynamic random access memory (SDRAM), RAMBUS™ dynamic random access memory (RDRAM), and/or a static random access memory (SRAM). Other forms of volatile memory are also contemplated. A connection, such as, but not limited to, USB connection 401, may provide a computer system access to the data in either the volatile memory 409 or the non-volatile memory 405. The USB connection 401 may also be a conduit for power from the computer system to the portable RAM drive to power the portable RAM drive while the portable RAM drive is connected to the computer system. The USB connection 401 may also provide power to recharge an internal power source 403 such as, but not limited to, a rechargeable battery or a capacitor. Other internal power sources 403 are also contemplated. In one embodiment, the memory controller chip 407 may include a microcontroller to control an indicator light (see FIG. 2) on the portable RAM drive 103.

Figure 2:
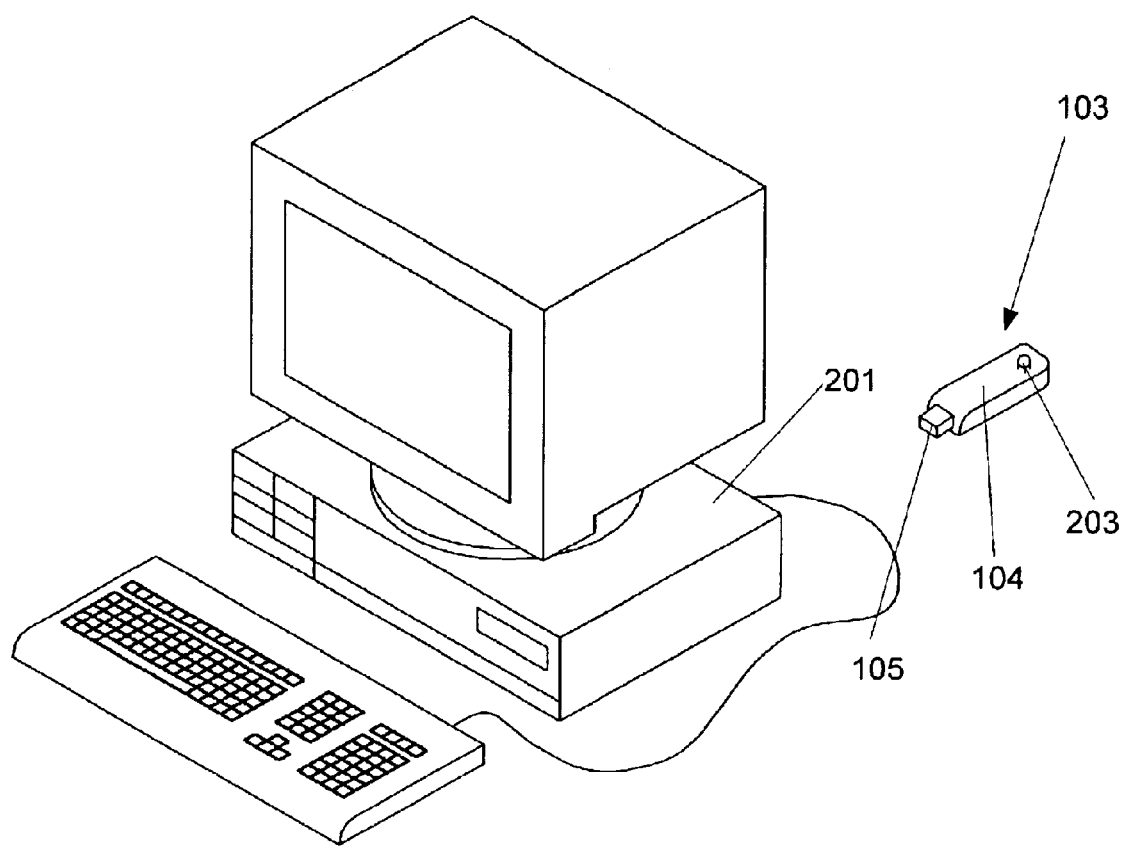
FIG. 2 illustrates a computer system and a portable RAM drive with an indicator light, according to one embodiment.

FIG. 2: A Portable RAM Drive with an Indicator Light

FIG. 2 illustrates one embodiment of a computer system and a portable RAM drive with an indicator. In one embodiment, the portable RAM drive 103 with the indicator, such as, but not limited to, indicator light 203, may connect to the computer system, such as, but not limited to, a personal computer 201, with a connector 105. Other indicators are also contemplated. For example, in one embodiment, an indicator may be displayed on a display device. In another embodiment, the indicator may be a noise source.

Figure 3:
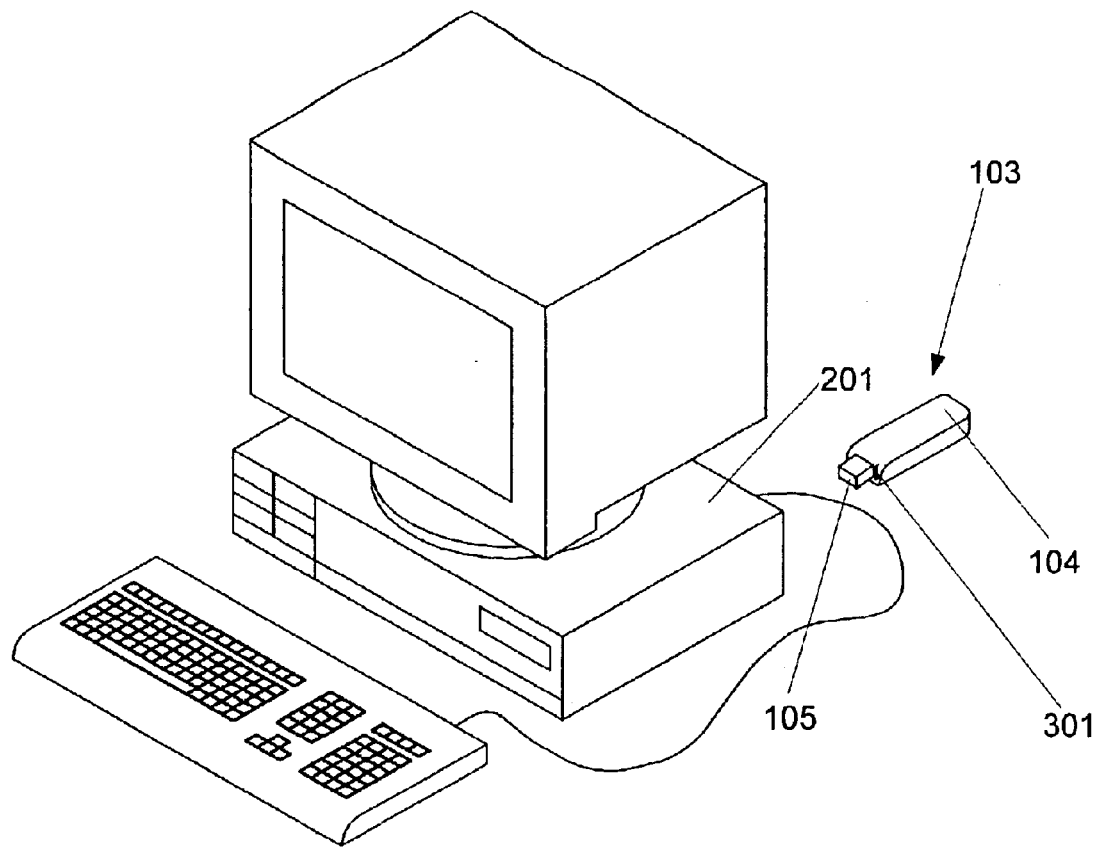
FIG. 3 illustrates a computer system and a portable RAM drive with a restraining mechanism, according to one embodiment.

FIG. 3: A Portable RAM Drive with a Restraining Mechanism

FIG. 3 illustrates one embodiment of a computer system and a portable RAM drive with a restraining mechanism. In one embodiment, a portable RAM drive 103 with a restraining device 301 may connect to a computer system, such as, but not limited to, a personal computer 201, with a connector 105. In one embodiment, the restraining device may be a mechanical device including, but not limited to a screw and a clip. Other restraining devices are also contemplated.

Figure 5:
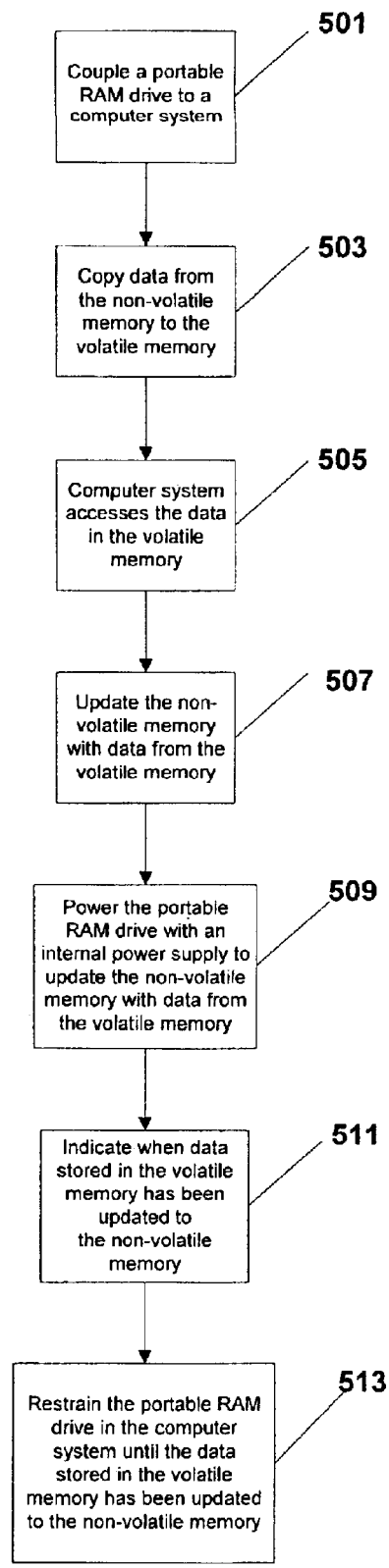
FIG. 5 is a flowchart of a portable RAM drive process, according to one embodiment.

FIG. 5: Flowchart for a Portable RAM Drive Process

FIG. 5 is a flowchart of one embodiment of a process for a portable memory apparatus. It should be noted that in various embodiments of the methods described below, one or more of the steps described may be performed concurrently, in a different order than shown, or may be omitted entirely. Other additional steps may also be performed as desired.

At 501, a portable RAM drive may be coupled to a computer system. The portable RAM drive may be coupled to the computer system through a connector on the portable RAM drive and a connector, such as, but not limited to, a USB connector, a firewire connector, and an ATA serial connector.

At 503, data may be copied from the non-volatile memory to the volatile memory in the portable RAM drive. In one embodiment, if the portable RAM drive has an internal power source, the computer system, or the portable RAM drive, may determine if the internal power source has sufficient power to transfer the data from the volatile memory in the portable RAM drive back to the non-volatile memory in the portable RAM drive if the portable RAM drive is unplugged from the computer system with data still in the volatile memory. As used herein, "transfer" may refer to copying data to another memory medium without erasing data in an originating memory medium or making changes to data stored in another memory medium to reflect changes in the data on the originating memory medium. Other transfers are also contemplated. If the internal power source has sufficient power to transfer the data from the volatile memory back to the non-volatile memory, the computer system or the memory controller chip may transfer the data from the non-volatile memory to the volatile memory for faster access by the computer system. In one embodiment, the computer system may access the data in the non-volatile memory until the internal power source in the portable RAM drive has recharged enough (with power delivered through the USB connection) to transfer data from the volatile memory to the non-volatile memory when the portable RAM drive is unplugged.

In one embodiment, if the portable RAM drive does not have the internal power source, the data may be transferred from the volatile memory to the non-volatile memory as soon as the portable RAM drive is connected to the computer system. The portable RAM drive may depend on an indicator light or restraining device to alert a user if the portable RAM drive needs more time to transfer data back to the non-volatile memory from the volatile memory when the user is ready to unplug the portable RAM drive from the computer system.

At 505, data in the volatile memory may be accessed by the computer system to be made available to the user. Because the computer system is accessing data in the volatile memory, time to access the data may be shorter than if the computer system had to access the data on the non-volatile memory.

At 507, the non-volatile memory on the portable RAM drive may be updated with data from the volatile memory as the portable RAM drive is being used by the computer system. In one embodiment, each write from the computer system made to the volatile memory may also be made to the non-volatile memory at the approximately the same time. In one embodiment, the data in the volatile memory may be periodically copied over to the non-volatile memory. In one embodiment, the portable RAM drive may transfer data in the volatile memory, with changes that are made by the computer system, to the non-volatile memory at one time. For example, the data in the volatile memory may be transferred to the non-volatile memory when the portable RAM drive is unplugged or about to be unplugged from the computer system.

At 509, the portable RAM drive may be powered by an internal power source to transfer data from the volatile memory to the non-volatile memory if the portable RAM drive is unplugged from the computer system before the data from the volatile memory is transferred back to the non-volatile memory.

At 511, in one embodiment, an indicator may be used on the portable RAM drive to indicate when data stored in the volatile memory has been transferred to the non-volatile memory. In one embodiment, the portable RAM drive may not have an indicator. The indicator may function while the portable RAM drive is coupled to the computer system to alert the user not to unplug the portable RAM drive until the data has been transferred from the volatile memory to the non-volatile memory. For example, the indicator may be used if the portable RAM drive does not have an internal power source. If the portable RAM drive does not have the internal power source, the portable RAM drive may receive power through connector. After the portable RAM drive is plugged into the computer system, power from the computer system may allow the portable RAM drive to transfer data from the non-volatile memory to the volatile memory. In one embodiment, the portable RAM drive may need to stay plugged into the computer system after the user is through using the portable RAM drive to transfer data from volatile memory to non-volatile memory. In one embodiment, if the portable RAM drive does not have an internal power source, the indicator light may indicate to a user that the portable RAM drive needs to remain in the computer system until the data from the volatile memory has been transferred to the non-volatile memory. In one embodiment, when the data from the volatile memory has been transferred to the non-volatile memory, and the portable RAM drive no longer needs power to maintain the data in the volatile memory, the indicator may turn off to indicate to the user that it is safe to remove the portable RAM drive.

Other uses of the indicator are also contemplated. For example, in one embodiment, the portable RAM drive may use an internal power source and an indicator light. For example, the indicator light may turn on when the portable RAM drive is first plugged into the computer system if the internal power source in the portable RAM drive has not been recharged to a level sufficient to power the portable RAM drive for transferring data from the volatile memory to the non-volatile memory when the portable RAM drive is unplugged from the computer system. The indicator light may turn off when the internal power source has sufficient power. The turned off indicator light may indicate that the computer system is now accessing the data through the volatile memory on the portable RAM drive. In one embodiment, the indicator light may also be used to indicate when the internal power source is being used to transfer the data from the volatile memory to the non-volatile memory. In one embodiment, the indicator light may flash to indicate a problem with the portable RAM drive (e.g., the internal power source is not charging properly). The user may be able to back up the data on the portable RAM drive before the problem causes a loss of data. Other uses of the indicator light may also be within the scope of the invention.

At 513, in one embodiment, the portable RAM drive may be restrained in the computer system until the data in the volatile memory has been transferred to the non-volatile memory. For example, in one embodiment, the portable RAM drive may not have an internal power source, but may receive power from the computer through the connector. As the portable RAM drive is inserted into the computer system, the restraining device may hold the portable RAM drive onto the computer system. When the user is finished using the portable RAM drive, the restraining device may prevent the user from removing the portable RAM drive before the data is transferred from the volatile memory to the non-volatile memory. In one embodiment, the restraining device may disengage after the data has been backed up on the non-volatile memory. In one embodiment, if the portable RAM drive does not have an internal power source, the data in the volatile memory may be lost if the portable RAM drive is removed from the computer system before the data is transferred from the volatile memory to the non-volatile memory.

In one embodiment, the portable RAM drive may have an internal power source and a restraining device. For example, the restraining device may engage when the computer is accessing the data on the volatile memory. Other reasons for having a restraining device with an internal power source may also be within the scope of the invention.

Various embodiments may further include receiving or storing instructions and/or information implemented in accordance with the foregoing description upon a carrier medium. Suitable carrier media may include storage media or memory media such as magnetic or optical media, e.g., disk or CD-ROM, random access memory, or other memory, as well as transmission media or RF signals such as electrical, electromagnetic, or digital RF signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A portable memory apparatus, comprising:

a housing;

a memory controller comprised in the housing;

a volatile memory coupled to said memory controller comprised in the housing;

a non-volatile memory coupled to said memory controller comprised in the housing;

a connector positioned on the housing, wherein said connector couples said portable memory apparatus to a computer system when said connector is plugged into said computer system; and wherein, when said connector couples said portable memory apparatus to said computer system, said memory controller chip copies data from said non-volatile memory to said volatile memory, and said computer system accesses said data in said volatile memory through said connector.

2. The portable memory apparatus of claim 1, further comprising an internal power source coupled to said portable memory apparatus.

3. The portable memory apparatus of claim 2, wherein said internal power source powers said portable memory apparatus when said portable memory apparatus is unplugged from said computer system, said portable memory apparatus copies data from said volatile memory to said non-volatile memory when said portable memory apparatus is unplugged from said computer system.

4. The portable memory apparatus of claim 2, wherein said internal power source is rechargeable through said connector.

5. The portable memory apparatus of claim 4, wherein said internal power source comprises a battery or a capacitor.

6. The portable memory apparatus of claim 1, wherein said memory controller chip transfers said non-volatile memory with data written to said volatile memory from said computer system while said portable memory apparatus is coupled to said computer system.

7. The portable memory apparatus of claim 6, further comprising an indicator coupled to said portable memory apparatus, wherein said indicator indicates when data stored in said volatile memory is being transferred to said non-volatile memory.

8. The portable memory apparatus of claim 6, further comprising a restraint device coupled to said portable memory apparatus, wherein said restraint device restrains said portable memory apparatus from being removed from said computer system until data stored in said volatile memory has been transferred to said non-volatile memory.

9. The portable memory apparatus of claim 1, wherein said volatile memory is selected from a group consisting of FPM DRAM, EDO DRAM, SDRAM, RDRAM, and SRAM.

10. The portable memory apparatus of claim 1, wherein said connection is selected from a group consisting of USB connector, firewire connector, and ATA serial connector.

11. The portable memory apparatus of claim 1, further comprising an outer impact resistant shell.

12. The portable memory apparatus of claim 1, wherein said portable memory apparatus does not have any moving parts.

13. The portable memory apparatus of claim 1, wherein said memory controller chip copies data from said non-volatile memory to said volatile memory after an internal power source has been recharged through said connection, that said internal power source has sufficient power to transfer data from said volatile memory to said non-volatile memory if said portable memory apparatus is unplugged from said computer system before said volatile memory is transferred to said non-volatile memory, wherein, until said internal power source recharges to said sufficient power, said computer system accesses said data on said non-volatile memory through said connector.

14. The portable memory apparatus of claim 1,
wherein said housing comprises a material selected from ABS plastic and polycarbonate.

15. A method, comprising:
coupling a portable memory apparatus to a computer system, wherein said portable memory apparatus comprises a memory controller chip, a non-volatile memory, and a volatile memory;
copying data from said non-volatile memory to said volatile memory using said memory controller chip;
accessing said data in said volatile memory using said computer system through a connector coupled to said portable memory apparatus and said memory controller chip; and updating said non-volatile memory with data from said volatile memory.

16. The method of claim 15, further comprising:
powering said portable memory apparatus with an internal power source coupled to said portable memory apparatus, when said portable memory apparatus is unplugged from said computer system, to transfer said non-volatile memory with data from said volatile memory.

17. The method of claim 15, further comprising:
recharging an internal power source coupled to said portable memory apparatus.

18. The method of claim 15, further comprising:
indicating when data stored in said volatile memory has been transferred to said non-volatile memory.

19. The method of claim 15, further comprising:
restraining said portable memory apparatus in said computer system until said data stored in said volatile memory has been transferred to said non-volatile memory.

20. The method of claim 15, further comprising:
copying said data from said non-volatile memory to said volatile memory after an internal power source has been recharged through said connection, such that said internal power source has sufficient power to transfer data from said volatile memory to said non-volatile memory if said portable memory apparatus is unplugged from said computer system before said volatile memory is transferred to said non-volatile memory, wherein, until said internal power source recharges to said sufficient power, said computer system accesses said data on said non-volatile memory through said connector.

* * * * *